United States Patent [19]
Arnold

[11] Patent Number: 4,565,099
[45] Date of Patent: Jan. 21, 1986

[54] METHOD AND APPARATUS FOR DETERMINING TENSION IN A CABLE

[75] Inventor: William S. Arnold, Houston, Tex.

[73] Assignee: Smiser Industries, Inc., Houston, Tex.

[21] Appl. No.: 646,802

[22] Filed: Sep. 4, 1984

[51] Int. Cl.$^4$ ............................................... G01L 5/10
[52] U.S. Cl. ................................................ 73/862.41
[58] Field of Search ................ 73/778, 862.41, 862.59, 73/517 AV, 704, 579, 581, 659

[56] References Cited

U.S. PATENT DOCUMENTS

| | | | |
|---|---|---|---|
| 3,540,271 | 11/1970 | Hoff | 73/862.41 |
| 4,158,962 | 6/1979 | Conoval | 73/862.41 |
| 4,281,547 | 8/1981 | Hinshaw et al. | 73/579 |

FOREIGN PATENT DOCUMENTS

| | | | |
|---|---|---|---|
| 2306632 | 8/1974 | Fed. Rep. of Germany | ... 73/862.41 |
| 3203935 | 8/1983 | Fed. Rep. of Germany | ... 73/862.41 |
| 0199928 | 12/1982 | Japan | ................................. 73/862.41 |

*Primary Examiner*—Charles A. Ruehl
*Attorney, Agent, or Firm*—Pravel, Gambrell, Hewitt & Kimball

[57] ABSTRACT

A method and apparatus for measuring tension in a suspended cable or the like, wherein the tension may be derived from sensor signals corresponding to the fundamental frequency of vibration in the cable and which enables accurate tension measurements to be made from sensors located at or near the terminal end of a span of cable.

13 Claims, 7 Drawing Figures

METHOD AND APPARATUS FOR DETERMINING TENSION IN A CABLE

BACKGROUND OF THE INVENTION

1. Field of Invention

The present invention relates to methods and apparatus for determining the tension in a span of material such as rope, cable, chain, belt, webbing or similar structure.

More particularly, the present invention pertains to methods and apparatus for measuring tension in a span of material using a sensor for determining the fundamental frequency of vibration in the material at points removed from mid-span of the tensioned cable.

2. Description of the Prior Art

In industrial, marine, oil field and numerous other applications, it is necessary and desirable to be able to determine and/or monitor tension in a suspended cable, chain, tubing or other elastic support so as to adjust tension to prescribed safe limits and to prevent damage or destruction due to overstressing. It is necessary, for example, to monitor the tension in electrical power conductors, tower guy wires, marine anchor chains or mooring lines, oil field tubing strings, wire rope for suspending apparatus in a well, materials used in manufacturing processes, as well as in many other applications.

Prior methods and apparatus for monitoring tension in cables or the like generally depended upon the detection of the frequency of vibrations occurring in the cable in response to mechanical or electrical perturbation and the known relationships of harmonic frequency to cable tension:

$$F = (\tfrac{1}{2}L)(T/m)^{\tfrac{1}{2}}, \text{ or}$$

$$T = (2\ LF)^2 m$$

where
- T = tension in the cable;
- L = length of the portion of cable free to vibrate;
- F = the fundamental frequency of vibration of the measured length of cable; and
- m = linear mass density.

Such a method and apparatus was described in U.S. Pat. No. 4,158,962. Variations of this same general approach were disclosed in U.S. Pat. Nos. 2,040,874; 2,265,786; 2,618,970; 2,923,150; 3,394,587; 3,403,553; 3,540,271; 3,871,217; 3,889,525; 3,942,369; 4,376,368 and 4,393,725.

Some prior systems used acoustic sensing and amplifying devices located near the mid-span point of the cable to generate an audible tone roughly corresponding to the frequency of vibration in the cable which resulted from physically or electrically "plucking" the cable as one would pluck a guitar string. The detected and amplified tone was aurally compared and matched by the operator to a tone generated by one of a set of prestressed cables or signals of known frequency to obtain an approximation of the resonant frequency of the monitored cable. Such systems were disclosed in U.S. Pat. Nos. 2,040,874 and 2,265,786 and were inherently inaccurate. These systems as well as most other prior methods ignored the contribution of second and higher order harmonics which made them useful only where precision was unnecessary and where mid-span location of the sensor, i.e., where higher order harmonics were least significant, was feasible.

Other prior systems provided a magnetic field surrounding a suspended portion of the cable and detected the frequency of alternating current or magnetic field perturbation caused by vibrations in the cable to estimate the cable tension. Such systems were disclosed in U.S. Pat. Nos. 2,618,970; 3,871,217; 3,889,525; 3,942,369 and 4,158,962. Those systems were limited to detection of tension in conductive media or required the use of conductive sleeves surrounding a non-conductive cable. The accuracy and detector location of these systems was limited since the contribution of second and higher order harmonics was ignored and the detector had to be located near mid-span of a supported portion of the cable.

A similar method and apparatus for measuring tension was disclosed in U.S. Pat. No. 3,403,553 which used an electrical pressure transducer in contact with a vibrating portion of the suspended cable to produce an electrical signal indicative of the frequency of cable vibrations. This system attempted to improve the accuracy of the frequency detection by passing the generated electrical signal through a low pass filter to eliminate random high frequency noise. Accurate measurement using this approach was nonetheless limited to mid-span locations where the contribution of higher order harmonics was less significant. Furthermore, this system made no provision for the error introduced due to dynamic changes in the relative amplitudes of first and second harmonics where threshold crossing frequency detection was used.

In many applications, it is not feasible or practical to locate the vibration detection sensor at or near mid-span of the vibrating object. For example, where a cable or chain is stretched over an expanse of water as is often encountered in offshore drilling, anchoring and mooring applications and in other such situations where access to a mid-span location is not practical. Moreover, it is generally desirable in most applications to locate the sensor near one end or the other of the cable to avoid creating physical obstructions that are a nuisance and at times a safety hazard.

In prior methods, tension was measured by reference to the resonant or natural frequency of vibration detected in the cable in accordance with the relationship between tension and frequency set forth above. All prior methods based the computation of tension upon measurement of the fundamental or first harmonic of the transverse vibration in the cable without disclosing an effective method of extracting the fundamental from the composite wave form which includes higher order harmonics. Thus, prior systems were not well suited for use with velocity or acceleration type detectors having frequency response characteristics which are greatly influenced by the presence of second and higher order harmonics.

There are numerous simultaneous, harmonically related, transverse vibration frequencies in the composite wave form that relate to tension according to the formula:

$$f_n = \frac{1}{2\pi}\left[\left(\frac{n\pi}{l}\right)^2\left(\frac{T}{m}\right) + \left(\frac{n\pi}{l}\right)^4\left(\frac{EI}{m}\right)\right]^{\tfrac{1}{2}}$$

where
- f = transverse vibration frequency;
- n = the order of the harmonics;

l = the length of span between two supports;
T = tension;
m = mass per unit length;
E = modulus of elasticity of the material; and
I = area moment of inertia of the material.

In prior methods, the sensor was located near mid-span of the cable to enable detection of the first or fundamental harmonic. Reference to FIG. 1 illustrates why this was feasible. The fundamental frequency or first mode is clearly the largest component of the composite waveform when measured near the mid-point. As one moves toward either end, however, the ratio of amplitude of the fundamental harmonic to those of higher order harmonics becomes progressively less. Thus, prior art methods which did not provide an effective means for extracting the fundamental frequency from the other harmonics necessarily were only useful if detection was at or near mid-span.

Generally speaking, three fundamental types of vibration sensors are feasible. These are acceleration sensors, velocity sensors and displacement sensors.

Displacement sensors, such as an electromechanical transducer detect amplitude of displacement in the cable and produce an analog output signal that is proportionate to the amplitude of the composite waveform in the cable, i.e., the summation of the amplitudes of all the harmonics at the location of the sensor.

A velocity sensitive transducer produces an output analog signal proportionate to the summation of the velocities of the various harmonics at the sensor location. Since velocity is directly proportional to frequency with amplitude constant, the output level of a velocity sensor increases with frequency. Thus, a doubling of the frequency, an octave, results in a doubling of the amplitude of the sensor output or a six decibel increase when the frequency response is plotted on a logarithmic scale. Consequently, the output corresponding to the second harmonic will have an amplitude which is amplified by two relative to the fundamental, the fourth harmonic by four, etc. Thus the composite output of the velocity sensor rapidly becomes rich in harmonics as the sensor is moved away from mid-point on the span and it becomes increasingly more difficult to detect the fundamental.

An acceleration sensitive transducer produces an output which is proportionate to the summations of the acceleration of the several harmonics at the sensor location. Since acceleration is the rate of change in velocity, an acceleration sensor will produce an output which quadruples in amplitude with each doubling in frequency. In other words, its frequency response plotted on a logarithmic scale increases at the rate of twelve decibels per octave. Thus, the output corresponding to second harmonic amplitude is amplified by four relative to the fundamental, fourth harmonic output by sixteen, etc., making the location of an acceleration sensor heretofore at any point other than mid-span highly undesirable.

A more subtle, deleterious, summing effect results from sensing the composite signals. The second harmonic adds an offset or bias to the composite. The magnitude of the offset is proportionate to the amplitude of the second harmonic. The relative amplitudes of the fundamental and second harmonic, shown in FIG. 1 for example, exist only momentarily, immediately after excitation. Since damping is proportional to velocity, the higher frequency components, i.e., the second harmonic, will decay faster than the fundamental, thereby changing the relative amplitude of the second and fundamental harmonics and thus the appropriate offset or bias level. This shifting produces error, especially if threshold crossing is used to convert frequency to voltage.

SUMMARY OF THE INVENTION

In contrast to prior systems, the method and apparatus of the present invention provides an economical, safe and reliable means for measuring tension using any of the commonly available sensors or detectors located at any point along the span of cable or the like. The method and apparatus of the present invention provides an output signal which is suitable for precise calculation of cable tension irrespective of sensor location. With the present invention, the output at all frequencies of the particular sensor used, whether it is a displacement, velocity or acceleration type, is normalized to the output level of the lowest frequency component that lies within the dynamic frequency range of the tensiometer. Frequencies below that range are blocked by high pass filters. Intermediate frequencies are passed through low pass filters that have frequency response characteristics which are the inverse of the corresponding sensor frequency response characteristics.

Specifically, where an acceleration sensor is used, the sensor output analog signal is passed through a high pass filter having a low threshold frequency slightly below the low end of the frequency bandwidth of the tensiometer. The signal is then passed through a low pass filter having a cut-off frequency approximately equal to the desired low end of the frequency bandwidth of the tensiometer and a roll-off rate or frequency response above that point which decreases at a twelve decibel per octave slope when plotted on a logarithmic scale. This intermediate filter normalizes the response of the detector by providing a frequency response which is the inverse of that of the acceleration detector.

If a velocity sensor is used, its analog output signal is similarly passed through high and intermediate low pass filters having threshold and cut off frequencies as described with respect to acceleration detectors. In this case, however, the intermediate low pass filter has a roll-off rate or frequency response which decreases at a six decibels per octave slope on a logarithmic scale to normalize the velocity signal.

If a displacement sensor is utilized, its output need only be passed through the high pass filter since an intermediate filter is not required. The high pass filter reduces the dynamic change in magnitude of the composite signal offset that results from unequal fundamental and second harmonic decay times. Alternatively, signals from displacement probes may be conditioned with a lead in active filter to provide a frequency response characteristic similar to that of velocity probe signals and the two types may thereafter be processed through the same compensation or normalization circuit.

DETAILED DESCRIPTION

Figure 2:
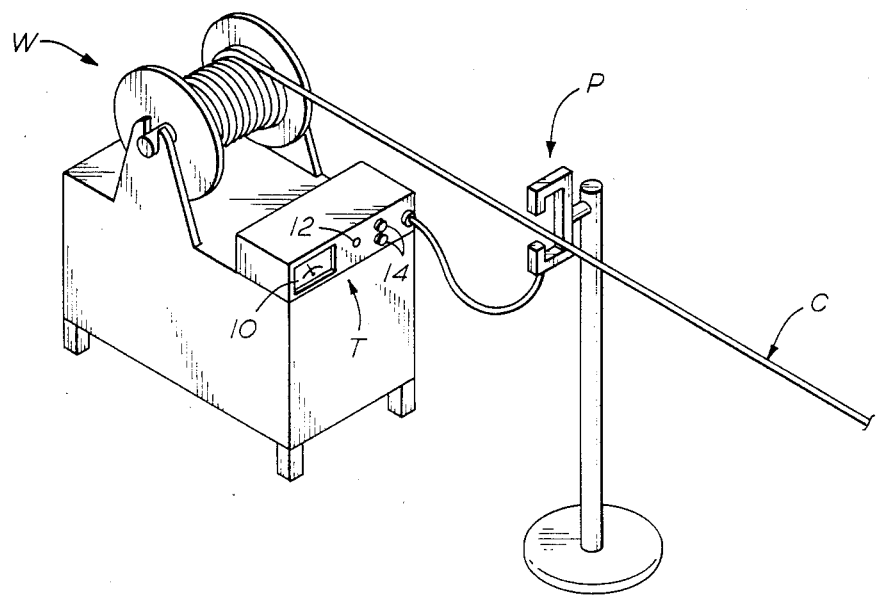
FIG. 2 is a schematic illustration of a typical application of the method and apparatus of the present invention.

In the drawings, the letter T designates generally a tensiometer according to the present invention. Referring to FIG. 2, tensiometer T is shown in proximity to a cable C which may be, for example, a mooring line running between a winch W and a moored vessel (not shown). By virtue of the method and apparatus of the present invention, as will be set forth in detail, tensiometer T is advantageously mounted near the winch end of cable C which is conveniently and safely accessible to the operator.

Tensiometer T receives an analog electric input signal from a probe P mounted on or in proximity to cable C. Probe P may be any suitable conventional electromagnetic, acoustic, electrooptic or other sensing apparatus which provides an output electrical signal indicative of the displacement, velocity or acceleration of vibrations in cable C naturally occurring as a result of environmental disturbance, or which are induced by periodically strumming the cable electromagnetically, mechanically or in any other suitable manner. Selection of a particular type probe P suitable for use with a specific application of the claimed invention is a matter within the ordinary skill in the art. The details and configuration of probe P, including the type of sensor and the method of strumming the cable C do not form a part of the claimed invention and hence need not be described in detail. With the present invention precise vibrational frequency determinations, and hence tension measurement, can be derived from a bridge point location, such as near the winch end of cable C (FIG. 2), rather than at mid-span, irrespective of whether a displacement, velocity or acceleration type probe P is used.

Tensiometer T includes a meter 10 for providing an instantaneous display of the tension in cable C and may include a warning or alarm indicator 12 which provides a visual or audible alarm if measured tension exceeds a prescribed value. Preferably, meter 12 includes a means for scaling meter deflection to accommodate different anticipated tension ranges in particular applications.

In the method and apparatus of the present invention tension in the cable C is determined according to relationship between the frequency of vibration and tension:

$$T = (2LF)^2 m$$

where
T is the tension;
L is the length of cable between spans;
F is the fundamental frequency; and
m is the mass/unit length of the cable.

Tensiometer T includes means, such as individual potentiometers 14 located on the operator panel, to permit the operator to adapt the circuit parameters of tensiometer T to measure tension in cables or the like of different lengths and mass per unit length.

By compensating the frequency response characteristic of the analog signal provided by a sensor such as conventional transducer probe P, accurate frequency measurements are obtained from a sensor located near a cable terminal end such as depicted in FIG. 2. Having obtained an accurate frequency determination, the derivation of tension in cable C is a matter of continuously solving the above equation for T utilizing appropriate integrated circuitry.

Figure 4:
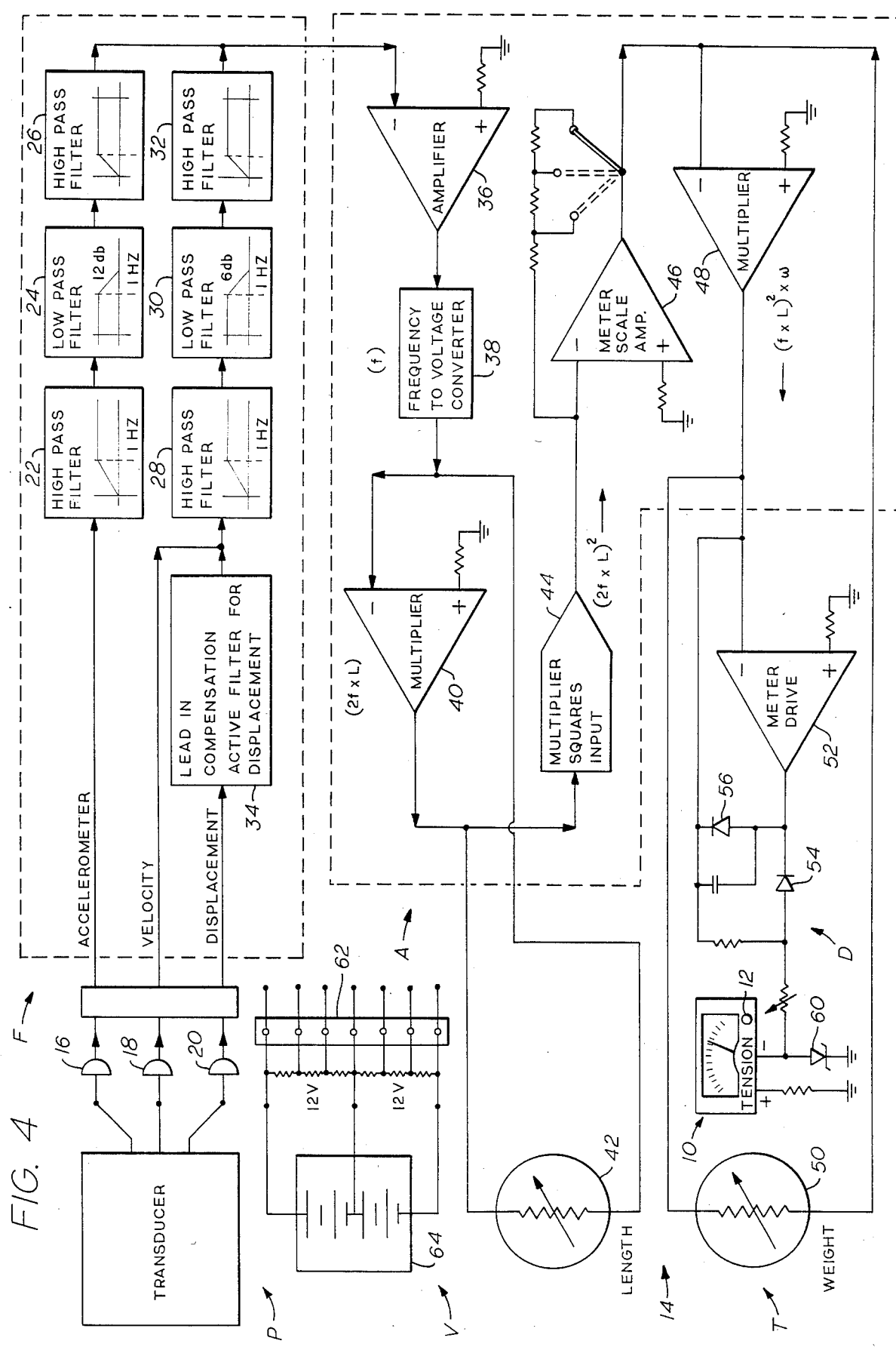
FIG. 4 is a schematic block diagram of the apparatus of the present invention.

Referring now to FIG. 4, tensiometer T includes a means, such as transducer probe P, for sensing vibration in the cable or similar structure to be measured or monitored, a probe signal compensation circuit F, an analog equation solving section A, display means D and a power supply V. In overall operation, analog voltage signals indicative of sensed vibrations in cable C from probe P are conditioned by filter section F to compensate or normalize the signal taking into consideration the frequency response characteristic of the particular type transducer being used. This normalized analog voltage signal is then processed through analog circuit A to derive a solution in analog voltage form to the equation $T=(2FL)^2 M$. This solution signal is then provided to display means D for display to the operator via meter 10.

Transducer probe P may be any suitable conventional electromagnetic, electrooptic, acoustic or other type sensing apparatus which provides an output voltage signal indicative of a sensed physical characteristic which may be related to the fundamental frequency of vibration in the cable, chain, line or like object or material under observation.

In practice, three fundamental types of conventional transducer probes P are used. These are acceleration sensitive, velocity sensitive and displacement sensitive. Each of these types of sensors detect a particular vibration characteristic by electrooptic, electromagnetic, acoustic or other coupling medium. A displacement sensitive transducer produces an analog voltage output signal that is proportional to the summation of the amplitudes of displacement of the several harmonics at the point of observation. A velocity transducer produces an analog voltage output signal proportional to the summation of the velocities of vibration of the several harmonics at the point of observation. An acceleration sensitive transducer produces an analog output voltage signal proportional to the summation of the detected accelerations of each of the several harmonics at the point of observation. Each of these basic types of detectors have peculiar frequency response characteristics which must be accounted for if transducer probe P is to be located away from mid-span on the cable or like object under observation.

Compensation circuit F of the present invention normalizes input signals from any of the three types of sensors to enable accurate frequency measurements to be made using sensors located away from mid-span of the cable. A velocity type sensor provides an output signal having an amplitude which increases directly with frequency, or a frequency response having a positive 6 decibel per octave slope if plotted on a logarithmic scale. Consequently, the amplitude of the response due to the second harmonic would be doubled, the fourth harmonic would be quadrupled, etc., if not compensated. Similarly, the amplitude of response due to harmonics where an acceleration type sensor is used would increase with frequency on a 12 decibel per octave slope if uncompensated. Compensation circuit F provides frequency response normalization or compensation for each of the three fundamental types of sensors.

Figure 1:
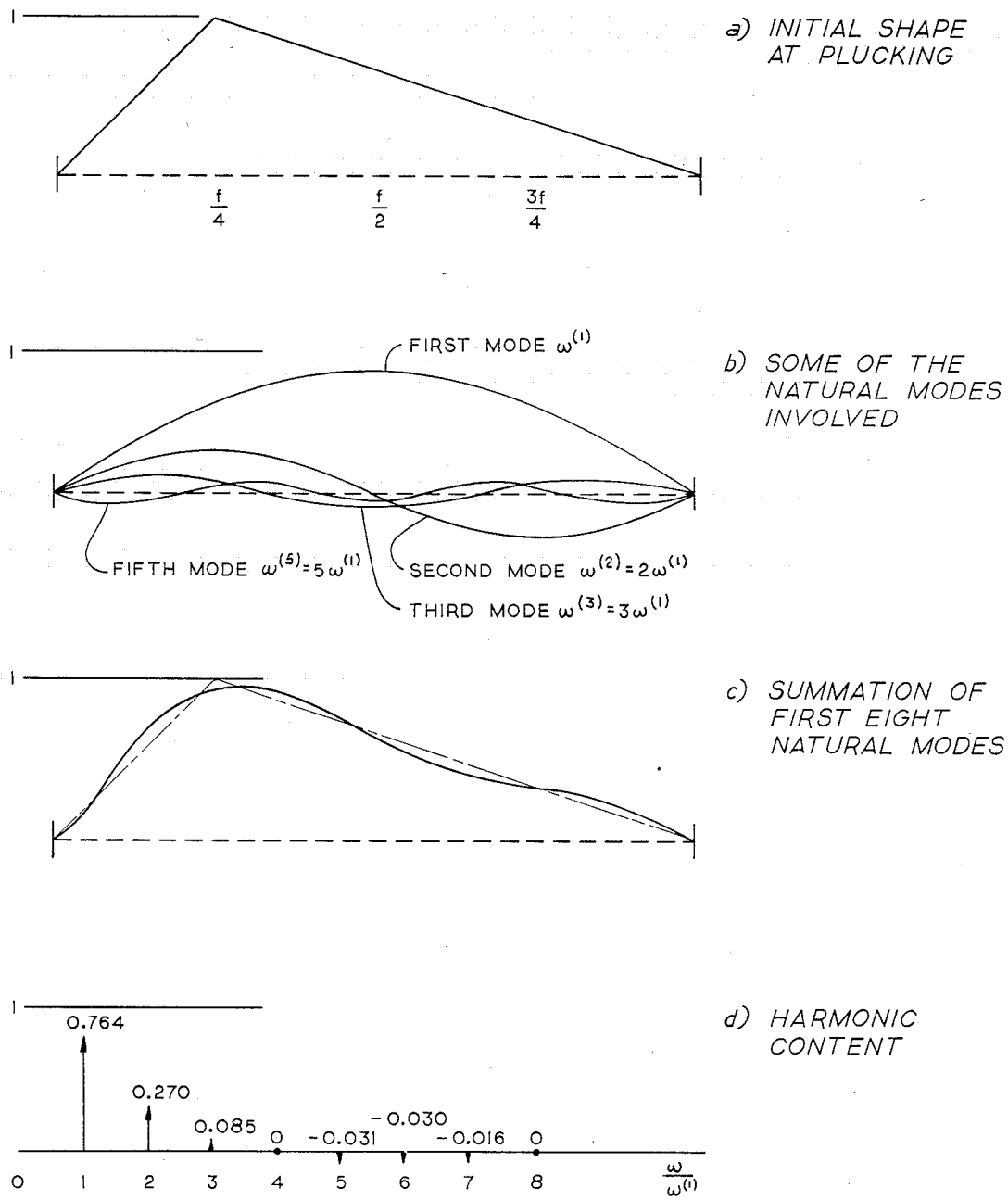
FIG. 1 is a series of diagrams depicting the typical harmonic spectrum of a tensioned elastic member such as a string or a cable.

A more subtle, deleterious effect on the accuracy of tension measurement results from sensing the composite vibration waveform. In particular, the second harmonic adds a constant offset or bias (see FIG. 1) proportional to the amplitude of the second harmonic. The relative amplitudes of the harmonics as shown in FIG. 1 exist only momentarily, immediately after excitation. Since damping is proportional to velocity, higher frequency components decay faster than do lower ones. The dynamic change in the relative amplitudes of the fundamental and second harmonic shifts the composite offset or bias level, thus introducing error if threshold crossing detection is used to convert frequency to voltage. In the present invention, compensation circuit F includes means whereby the sensor signals are processed to eliminate this source of error.

As seen in FIG. 4, signals from probe P are provided to one of three input jacks 16, 18, 20 adapted to suit acceleration, velocity and displacement type probes, respectively. Signals received from an acceleration type sensor via jack 16 are processed in sequence through filters 22, 24 and 26. High pass filter 22 is configured to have a cut-off frequency slightly below the low end of the desired tensiometer bandwidth to eliminate extremely low frequency signals which typically are due to "noise" factors such as the wave action on an anchor chain or mooring line and dynamic offset shift due to unequal decay times of the fundamental and second harmonics. Filter 24 is a low pass filter having a high frequency cut-off at the low end of the desired tensiometer bandwidth and a frequency response with a negative 12 db/octave slope from cut-off when plotted on a logarithmic scale. Filter 26 is a second high pass filter having a high frequency cut-off at about the lower limit of the desired frequency response of tensiometer T which provides further attenuation of low frequency noise and blocks any amplifier offset drift which may be introduced by filter 24. In this fashion, signals originating from an acceleration type probe P are compensated to eliminate spurious low frequency elements and to normalize the higher frequency harmonic elements to enable accurate detection of the fundamental frequency near a terminal or bridge point of a cable C or the like.

Signals originating from velocity type probe P provided as an input to jack 18 are processed sequentially through filters 28, 30 and 32. Filter 28 is a series resistor/capacitor high pass filter [FIG. 3(c)] which blocks signals having a frequency slightly below desired tensiometer bandwidth. The noise or fluctuation imparted to the direct current offset or bias due to differential damping of the fundamental and second harmonics generally fall below the desired tensiometer bandwidth and are thus blocked by filter 28.

Filter 30 is a low pass filter having a cut off frequency at the low end of the desired tensiometer bandwidth and a frequency response from cut-off having a negative 6 decibel per octave slope when plotted on a logarithmic scale. Low pass filter 30 thus provides compensation to normalize velocity type probe signals which inherently have a frequency response which increases linearly with frequency, i.e., a positive 6 decibel per octave slope. Filter 32 is a second high pass filter having a cut-off at the lower end of the desired frequency response of tensiometer T which provides further attenuation of low frequency noise and blocks any amplifier offset drift which may be introduced by filter 30.

Signals originating from a displacement type probe P are provided as inputs to jack 20 and processed sequentially through filters 34, 28, 30 and 32 (FIG. 4). Alternatively, filter 34 could be included integrally with the displacement probe P so that signals from displacement and velocity type probes could both be input through jack 18 and processed identically. Filter 34 is a high pass filter having a threshold frequency at the low end of the desired tensiometer bandwidth and a frequency response after threshold having a positive 6 decibel per octave slope, thus conditioning displacement probe signals to have the same frequency response characteristic as do velocity probe signals.

Figure 3A:
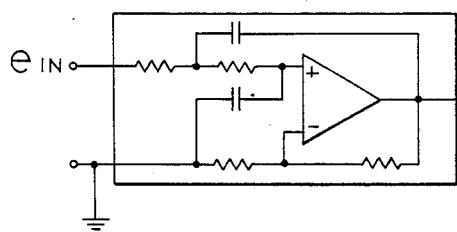
FIGS. 3a, b, c and d are schematic block diagrams of a portion of the apparatus of the present invention.
Figure 3B:
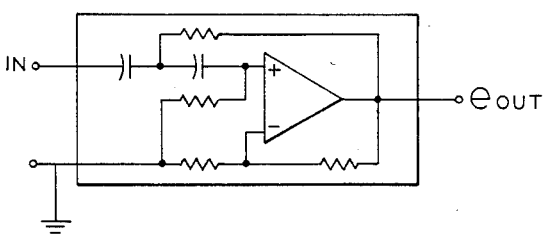

High pass filter 22 may be any suitable conventional filter circuit having the specified frequency response and low level signal processing characteristics. In practice, filter 22 is a unity gain Sallen-Key operational amplifier second order active filter of the type illustrated in FIG. 3(b). Low pass filters 24 and 30 may likewise be any suitable conventional filter circuit having the specified frequency response and low level signal processing characteristics suitable for use with probe or sensor level signals. In practice, filters 24 and 30 are unity gain Sallen-Key operational amplifier second order low pass filters of the type illustrated in FIG. 3(a). Filters 22, 24 and 30 may be formed using different input and output terminals on a single integrated circuit containing one or more independently functioning operational amplifiers and associated resistors and capacitors having impedance values to provide the desired frequency response, gain and damping characteristics.

Figure 3C:
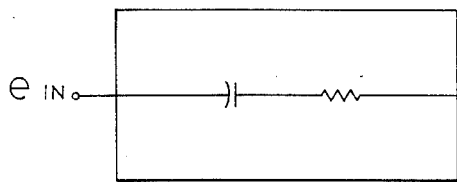

Filters 26 and 32 are conventional RC series high pass filters as shown in FIG. 3(c) having impedance values selected to provide the appropriate cut-off frequency.

Figure 3D:
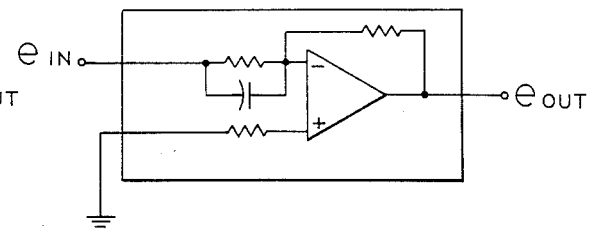

Filter 34 is a high pass operational amplifier active filter of the type schematically illustrated in FIG. 3(d) having input and feedback resistance and capacitance impedance values selected to provide the specified frequency response and low level signal processing characteristics.

The compensated probe or sensor signals from compensation circuit F are then provided as input signals to analog circuit A. Circuit A provides an analog circuit means for solving the equation $T=(2FL)^2 m$, using the output signal from circuit F as the analog of the sensed fundamental frequency of vibration in the cable C. Circuit A includes a conventional integrated circuit amplifier 36 for increasing the signal strength of the frequency signal received from circuit F, and an integrated circuit frequency to voltage converter 38 for providing an analog voltage output signal having a voltage level which is proportional to the frequency of the input signal received from circuit F. Frequency to voltage converter 38 may be any suitable conventional analog circuit such as are commonly available in integrated circuit form.

The analog voltage output signal from converter 38 is then provided as an input to operational amplifier multiplier circuit 40. Multiplier 40 is a closed loop feedback amplifier circuit, having a gain which may be adjusted by adjusting the value of feedback resistance via potentiometer 42. The input impedance and feedback resistance of circuit 40 can thus be calibrated to provide gain proportional to the length of cable or other object under observation. The output of circuit 40 is thus calibrated to be a voltage signal analogous to the value $(f \times l)$ in the tension equation set forth above.

The output signal from multiplier 40 is provided as an input to multiplier 44 which is a conventional integrated circuit multiplier configured to provide a voltage signal output which is the square of that provided to it as an input signal. The output signal from multiplier 44 is thus a voltage signal analogous to $(FL)^2$. This output signal is then provided as an input to meter scale amplifier 46 which is a conventional integrated circuit operational amplifier having a closed loop feedback resistance and hence gain which may be adjusted to one of several values to set the scale of meter 10 to suit anticipated observed tension values.

The output signal from amplifier 46 is provided as an input to amplifier 48 which is a conventional integrated circuit operational amplifier having an adjustable gain calibrated so that adjustments to the gain via closed loop feedback resistance potentiometer 50 correspond linearly to the output level. In this manner, the value of resistance 50 is made directly analogous to the weight/unit length of the object under observation, and the output signal of amplifier 48 is a voltage analogous to $(2f \times l)^2 \times m$. It is understood that m corresponds to weight w divided by the gravitational constant.

The output signal from amplifier 48 is provided as an input to display circuit D. Circuit D includes meter drive amplifier 52 which is a conventional integrated circuit operational amplifier configured to provide an output signal which is suitable as an input for meter 10. Thus, the gain and output impedance characteristics of amplifier 52 must be matched to the input signal requirements of the particular meter being used in the manner known in the art. Display circuit D also includes output diodes 54, 56 which block incorrect or reverse polarity output signals from amplifier 52 to protect meter 10. A zener diode 60 shunts the output of amplifier 52 to protect meter 10 from excessive current.

The signal provided to meter 10 for display is thus continuously and linearly analogous to tension in cable C as the solution to the equation $T = (2f \times l)^2 \times m$.

Tensiometer T also includes a conventional voltage supply V suitable for portable instrument use, such as nickel-cadmium batteries 64 or the like, and a voltage divider network 62 to provide different levels of direct current supply voltage for the various integrated circuit components. Preferably, circuit 62 also includes a conventional voltage regulator circuit (not shown) which provides positive and negative polarity direct current supply voltage at levels less than the rated voltage of batteries 64 to allow proper operation of tensiometer T even when the battery voltage has decayed somewhat.

By calibrating meter 10 in the manner as is known in the art so that displayed meter indications correspond to known tensions under test conditions, tensiometer T is calibrated to provide a continuous, accurate display of observed tension in cables or similar objects under observation.

The foregoing disclosure and description of the invention are illustrative and explanatory thereof, and various changes in the size, shape, materials, components, circuit elements, wiring connections and contacts, as well as in the details of the illustrated circuitry and construction may be made without departing from the spirit of the invention.

I claim:

1. An apparatus for measuring tension in a cable or like object comprising:
   sensor means for sensing vibrations occurring in the object, said sensor means further including means for generating a sensor signal indicative of the sensed frequency of vibration in the object under observation;
   filter means for receiving the sensor signal and providing as an output a compensated sensor signal, said filter means having a characteristic frequency response which is substantially the inverse function of the characteristic frequency response of said sensor means;
   tension deriving means for receiving the compensated sensor signal and deriving therefrom a signal analogous to tension.

2. The apparatus of claim 1, wherein said tension deriving means comprises an electrical circuit adapted to solve the equations $T = (2FL)^2 M$ where
   T is the tension in the object;
   F is the sensed fundamental frequency of vibration;
   L is the span length of the object under observation; and
   M is the mass per unit length of the object under observation.

3. The apparatus of claim 2 wherein said tension deriving means comprises:
   frequency to voltage converter circuit means for receiving the compensated sensor signal as an input signal and providing an output signal analogous to the frequency of the compensated sensor signal;
   a first multiplier circuit means for receiving the output signal from said converter circuit means as an input signal and providing an output signal which is analogous to the product of the input signal received from said converter circuit multiplied by the span length of the object under observation;
   squaring circuit means for receiving the output signal from said first multiplier circuit means as an input signal and providing an output signal which is analogous to the square of the signal received from said first multiplier circuit means; and
   a second multiplier circuit means for receiving the output signal from said squaring means as an input signal and providing an output signal which is analogous to the product of the signal received from said squaring circuit means multiplied by the weight per unit length of the object under observation.

4. The apparatus of claim 3 wherein:
   said first multiplier circuit means includes an amplifier circuit means an adjustable gain to permit adjustment of the multiplier value corresponding to the length of the object under observation; and
   said second multiplier circuit means includes an amplifier circuit means having an adjustable gain to permit adjustment of the multiplier value corresponding to the weight per unit length of the object under observation.

5. The apparatus of claim 1, wherein:
   said sensor means comprises means for generating a signal which is indicative of sensed velocity of vibrations in the object under observation; and
   said filter means includes a low pass filter circuit having a frequency response characterized by a negative six decibel per octave slope on a logarithmic scale in the frequency bandwidth of the tension measuring apparatus.

6. The apparatus of claim 5 wherein said filter means further comprises:
   a high pass filter circuit having a frequency response characterized by a threshold frequency corresponding to the desired low frequency response of the apparatus.

7. The apparatus of claim 1, wherein:
   said sensor means comprises means for generating a signal indicative of sensed acceleration of vibrations in the object under observation; and said filter means includes a low pass filter circuit having a frequency response characterized by a negative twelve decibels per octave slope on a logarithmic scale in the frequency bandwidth of the tension measuring apparatus.

8. The apparatus of claim 7 wherein said filter means further comprises:
a high pass filter circuit having a frequency response characterized by a threshold frequency corresponding to the desired low frequency response of the apparatus.

9. The apparatus of claim 1, wherein:
said sensor means comprises means for generating a signal indicative of the displacement of vibrations in the object under observation; and
said filter means comprises a high pass filter circuit having a frequency response characterized by a threshold frequency corresponding to the desired low frequency response of the apparatus.

10. The apparatus of claim 1 wherein said sensor means may be selected to be means for generating a signal indicative of either the displacement or velocity of vibrations in the object under observation; and wherein said filter means further comprises:
a lead in high pass filter circuit having a frequency response characterized by positive six decibel per octave slope on a logarithmic scale in the frequency bandwidth of the tension measuring apparatus for initially processing signals from said displacement probe only;
a high pass filter circuit having a frequency response with a threshold frequency corresponding to the desired low frequency response of the apparatus; and
a low pass filter circuit having a frequency response characterized by a negative six decibel per octave slope on a logarithmic scale in the frequency bandwidth of the tension measuring apparatus.

11. A method for measuring tension in a cable or like object comprising the steps of:
sensing vibrations occurring in the object;
generating a sensor signal indicative of the sensed vibrations;
normalizing the sensor signal to the lowest frequency component of the sensor signal within the bandwidth of the apparatus;
deriving a tension value corresponding to the tension in the object under observation from the normalized sensor signal.

12. The method of claim 11, wherein said step of normalizing the sensor signal comprises:
providing the sensor signal to a filter circuit having a characteristic frequency response which is substantially the inverse function of the frequency response of the means used to carry out the steps of sensing vibrations and generating the sensor signal.

13. The method of claim 11, wherein said step of deriving a tension value comprises deriving a solution to the equation $T=(2FL)^2 M$ where
T is the tension in the object;
F is the sensed fundamental frequency of vibration;
L is the span length of the object under observation; and
M is the mass per unit length of the object under observation.

* * * * *